United States Patent
Yoshida

(10) Patent No.: US 11,762,612 B2
(45) Date of Patent: Sep. 19, 2023

(54) INFORMATION PROCESSING APPARATUS, INFORMATION PROCESSING SYSTEM, AND INFORMATION PROCESSING METHOD FOR MANAGING AUTHENTICATION INFORMATION ACROSS MULTIPLE INFORMATION PROCESSING DEVICES, INFORMATION PROCESSING APPARATUSES, AND INFORMATION PROCESSING SYSTEMS

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/455,083

(22) Filed: Nov. 16, 2021

(65) Prior Publication Data

US 2022/0164147 A1    May 26, 2022

(30) Foreign Application Priority Data

Nov. 24, 2020 (JP) ................................ 2020-194645

(51) Int. Cl.
*G06F 3/12* (2006.01)
*G06F 21/34* (2013.01)

(52) U.S. Cl.
CPC .......... *G06F 3/1238* (2013.01); *G06F 3/1204* (2013.01); *G06F 3/1222* (2013.01); *G06F 21/34* (2013.01)

(58) Field of Classification Search
None
See application file for complete search history.

(56) References Cited

U.S. PATENT DOCUMENTS

| 6,789,078 B2 | 9/2004 | Saitou et al. |
| 10,686,781 B1 | 6/2020 | Kaditz et al. |

(Continued)

FOREIGN PATENT DOCUMENTS

| JP | 2002-074188 | 3/2002 |
| WO | 2017/070412 | 4/2017 |
| WO | 2020/047710 | 3/2020 |

OTHER PUBLICATIONS

Extended European Search Report for 21208403.2 dated Apr. 14, 2022.

*Primary Examiner* — Thomas D Lee
(74) *Attorney, Agent, or Firm* — IPUSA, PLLC

(57) ABSTRACT

An information processing apparatus communicates with a mobile terminal used by a user. The information processing apparatus includes circuitry; and a memory storing computer-executable instructions that cause the circuitry to execute managing account information including login information of the user; receiving, from the mobile terminal, a first login request including the login information of the user; allowing login from the mobile terminal upon comparing the login information included in the first login request with the login information included in the account information; associating identification information unique to the mobile terminal with the account information, upon receiving the identification information from the mobile terminal for which the login is allowed; receiving, from an electronic device, a second login request including the identification information; and allowing login from the electronic device upon comparing the identification information included in the second login request with the identification information associated with the account information.

10 Claims, 13 Drawing Sheets

(56) References Cited

U.S. PATENT DOCUMENTS

2021/0092241 A1    3/2021  Yoshida et al.
2021/0218725 A1*   7/2021  Fang .................... H04L 63/083

\* cited by examiner

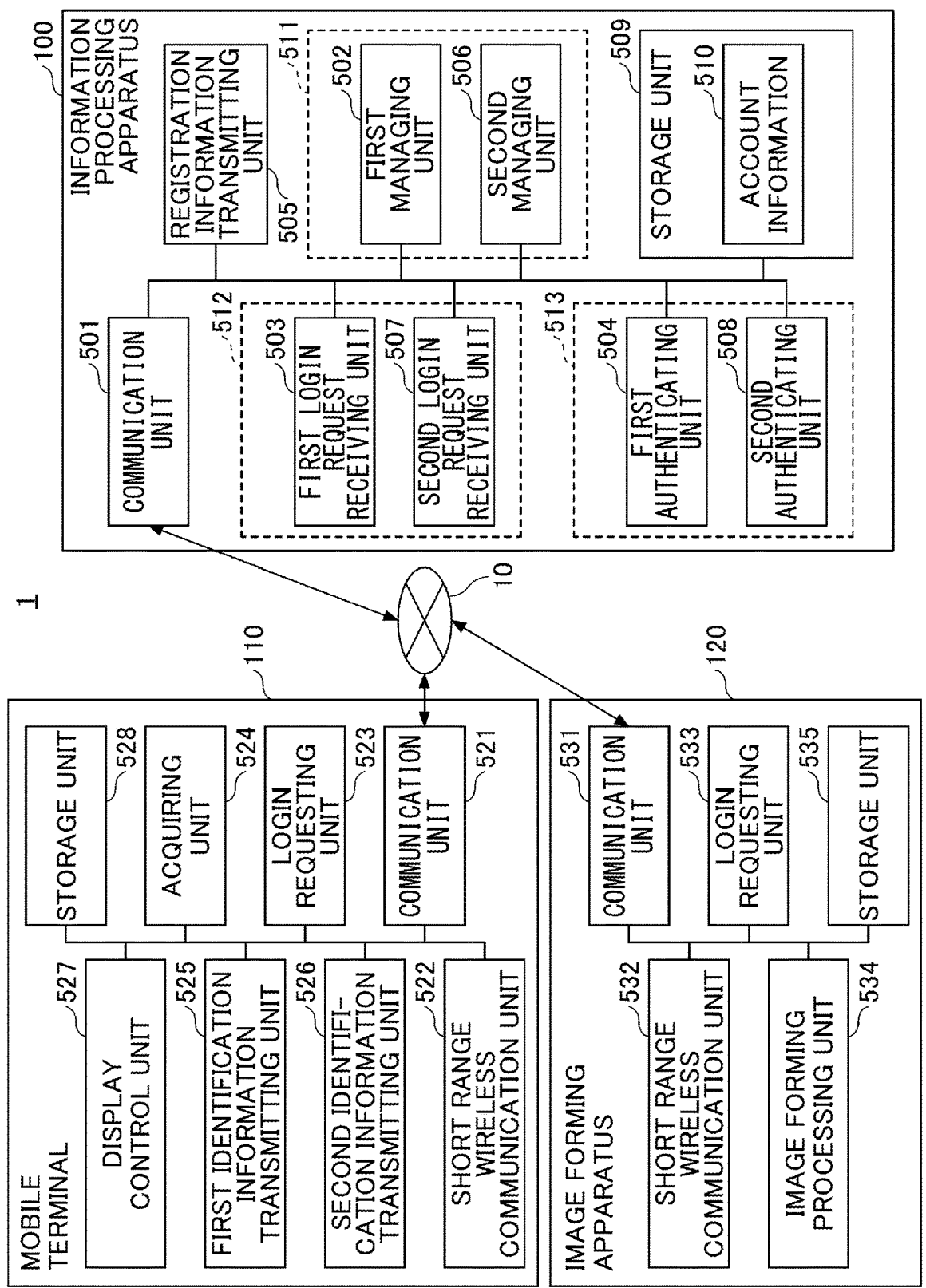

FIG.6A

| USER ID | PASSWORD | USER NAME | TERMINAL IDENTIFICATION INFORMATION | STATE | ... |
|---|---|---|---|---|---|
| aaa@xxx.com | abab | USER A | xxxxxx | LOGGED IN | ... |
| bbb@xxx.com | bcbc | USER B | – | LOGGED OUT | ... |
| ccc@xxx.com | cdcd | USER C | – | LOGGED IN | ... |
| ... | ... | ... | ... | ... | ... |

| USER ID | PASSWORD | USER NAME | TERMINAL IDENTIFICATION INFORMATION | STATE | |
|---|---|---|---|---|---|
| aaa@xxx.com | abab | USER A | xxxxxx | LOGGED IN | ... |
| | | | yyyyyy | | |
| bbb@xxx.com | bcbc | USER B | ... | LOGGED OUT | ... |
| | | | — | | |
| | | | — | | |
| ... | ... | ... | ... | ... | ... |

510

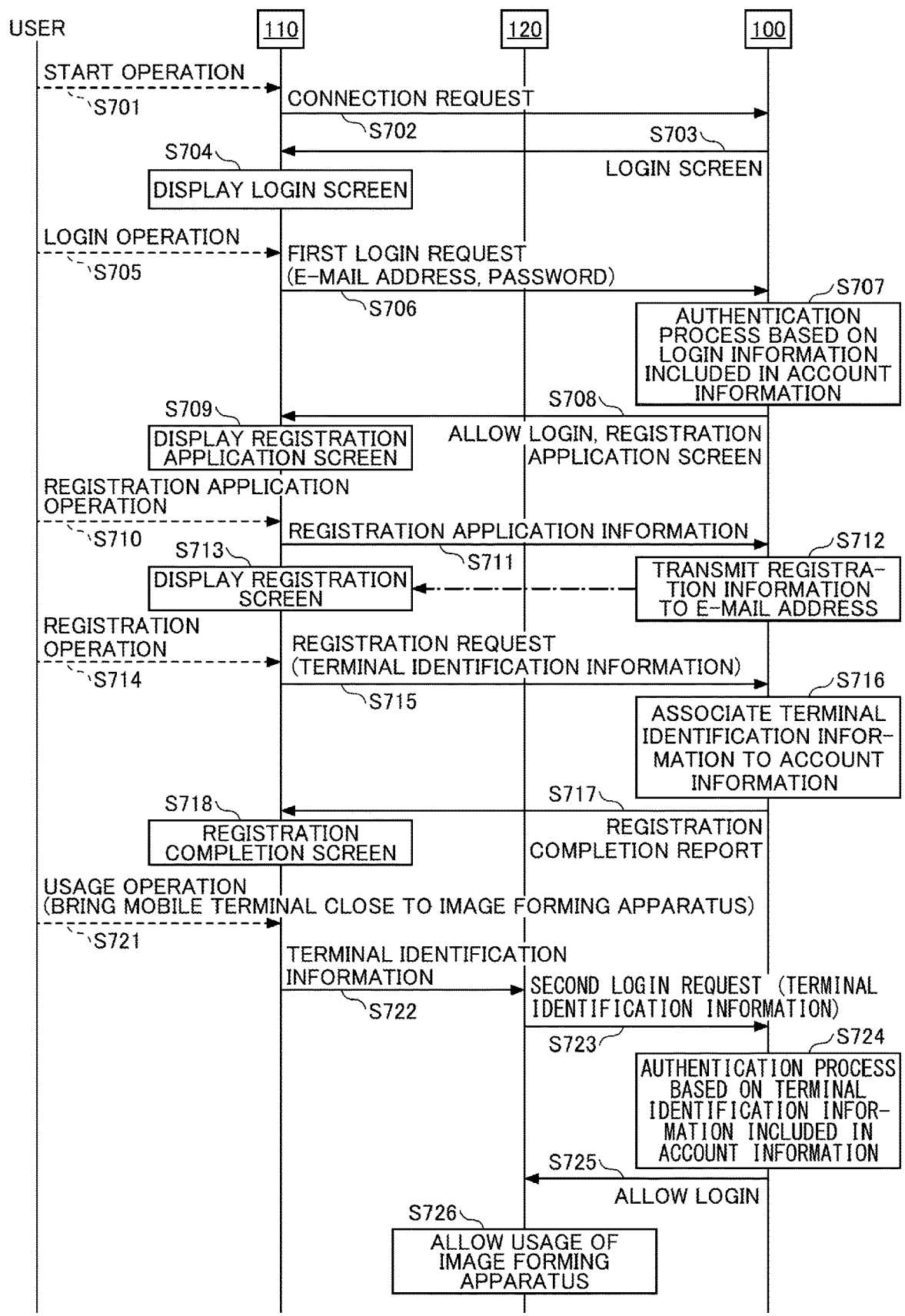

INFORMATION PROCESSING APPARATUS, INFORMATION PROCESSING SYSTEM, AND INFORMATION PROCESSING METHOD FOR MANAGING AUTHENTICATION INFORMATION ACROSS MULTIPLE INFORMATION PROCESSING DEVICES, INFORMATION PROCESSING APPARATUSES, AND INFORMATION PROCESSING SYSTEMS

CROSS-REFERENCE TO RELATED APPLICATION

The present application is based on and claims priority under 35 U.S.C. § 119 to Japanese Patent Application No. 2020-194645, filed on Nov. 24, 2020, the contents of which are incorporated herein by reference in their entirety.

BACKGROUND OF THE INVENTION

1. Field of the Invention

The present invention relates to an information processing apparatus, an information processing system, an information processing method, and a recording medium.

2. Description of the Related Art

Server apparatuses that provide predetermined services upon receiving user logins from a plurality of terminal apparatuses such as a personal computer (PC), a mobile terminal, and an electronic device used by the user, are known.

For example, in a server apparatus capable of receiving access from a terminal apparatus and a mobile phone, there is known a technique of managing member information in a unified manner, by associating a member ID and a password registered from the terminal apparatus with identification information that is unique to the mobile phone (for example, see Patent Document 1).

Patent Document 1: Japanese Unexamined Patent Application Publication No. 2002-74188

SUMMARY OF THE INVENTION

According to one aspect of the present invention, there is provided an information processing apparatus configured to communicate with a mobile terminal used by a user, the information processing apparatus including circuitry; and a memory storing computer-executable instructions that cause the circuitry to execute managing account information including login information of the user; receiving, from the mobile terminal, a first login request including the login information of the user; allowing login from the mobile terminal upon comparing the login information included in the first login request with the login information included in the account information; associating identification information unique to the mobile terminal with the account information, in response to receiving the identification information from the mobile terminal for which the login is allowed; receiving, from an electronic device, a second login request including the identification information; and allowing login from the electronic device upon comparing the identification information included in the second login request with the identification information associated with the account information.

BRIEF DESCRIPTION OF THE DRAWINGS

FIG. 5 is a diagram illustrating an example of a functional configuration of an information processing system according to a first embodiment of the present invention;

FIGS. 6A and 6B are diagrams illustrating an example of account information according to the first embodiment of the present invention;

FIG. 7 is a sequence diagram illustrating an example of a process of an information processing system according to the first embodiment of the present invention;

DESCRIPTION OF THE EMBODIMENTS

According to the technique disclosed in Patent Document 1, for example, by accessing a server apparatus from a mobile phone and inputting account information such as a registered member ID and password into a mobile phone, it is possible to receive services from a mobile phone in the same manner as a terminal apparatus.

On the other hand, there is demand to log in to an information processing apparatus such as a server apparatus, from an electronic device, for example, an image forming apparatus, shared by a plurality of users, by using account information such as a user ID and a password already registered in the information processing apparatus.

However, the conventional technology such as that disclosed in Patent Document 1 has a problem that, in order to enable login to the information processing apparatus from the electronic device by using the registered account information, the account information has to be input to an operation unit of the electronic device.

A problem to be addressed by an embodiment of the present invention is to enable login to an information processing apparatus from an electronic device by using account information registered in the information processing apparatus, without inputting account information to an operation unit of the electronic device.

Hereinafter, embodiments of the present invention will be described with reference to the accompanying drawings.

<System Configuration>

Figure 1:
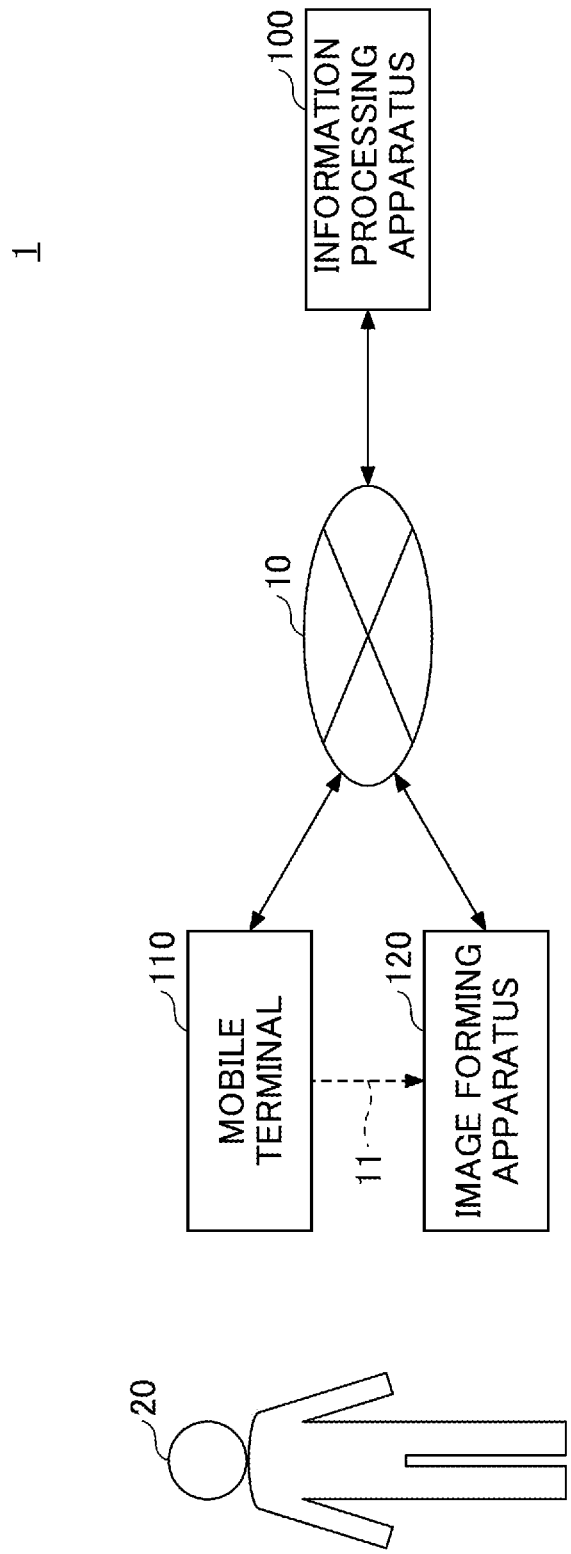
FIG. 1 is a diagram illustrating an example of a system configuration of an information processing system according to an embodiment of the present invention.

FIG. 1 is a diagram illustrating an example of a system configuration of an information processing system according to an embodiment. An information processing system 1 includes, for example, an information processing apparatus 100 connected to a communication network 10 such as the Internet or a local area network (LAN), a mobile terminal 110, and an electronic device such as an image forming apparatus 120. The information processing system 1 is a system that enables a user 20 who has already registered his or her account information in the information processing apparatus 100 to easily log in to an electronic device such as the image forming apparatus 120, by using the mobile terminal 110.

The information processing apparatus 100 is, for example, an information processing apparatus having a computer configuration or a system including a plurality of information processing apparatuses, and is communicably connected to the mobile terminal 110 and the image forming apparatus 120 via the communication network 10. The information processing apparatus 100 may be referred to as, for example, an authentication system, an authentication server, or the like. The information processing apparatus 100 manages the account information of the user 20 including both identification information (hereinafter, referred to as the "user ID") for identifying the user 20 and login information such as a password. When a login request including the login information is received from the mobile terminal 110 used by the user 20, the information processing apparatus 100 compares the login information included in the login request with the login information included in the account information, and allows the login from the mobile terminal 110.

Further, the information processing apparatus 100 manages, based on a predetermined registration operation by the user 20, identification information unique to the mobile terminal used by the user 20 (hereinafter, referred to as the terminal identification information) by association with the account information of the user. When a login request including the terminal identification information is received from an electronic device such as the image forming apparatus 120, the information processing apparatus 100 compares the terminal identification information included in the login request with the terminal identification information associated with the account information, and allows the login from the electronic device.

The mobile terminal 110 is an information terminal used by the user 20 such as a smartphone, a tablet terminal, a wearable terminal, or a mobile phone, and an application program (hereinafter, referred to as an "application") corresponding to the information processing system 1 is installed in the mobile terminal 110. The mobile terminal 110 performs a process of logging in to the information processing apparatus 100, a process of registering the terminal identification information of the mobile terminal 110 to the information processing apparatus 100, and a process of transmitting the terminal identification information to an electronic device such as the image forming apparatus 120, by executing the application.

For example, the user 20 having the account information registered in the information processing apparatus 100 can log in to the information processing apparatus 100 (login process) by activating an application on the mobile terminal 110 and performing a predetermined login operation on the login screen displayed by the application.

Further, the user 20 can associate the terminal identification information unique to the mobile terminal 110 with the account information of the user 20 (registration process) by performing a predetermined registration operation on the registration screen displayed by the application. For example, a Universally Unique Identifier (UUID) of the mobile terminal 110 or the UUID of the application may be applied as the identification information (terminal identification information) unique to the mobile terminal 110. However, the terminal identification information is not limited thereto, and the terminal identification information may include various kinds of information that can identify the mobile terminal 110 within the information processing system 1, for example, identification information such as the phone number of the mobile terminal 110 or a tag ID of Near Field Communication (NFC).

Further, the user 20 can transmit terminal identification information of the mobile terminal 110 to the electronic device by short range wireless communication 11 by holding (bringing into proximity) the mobile terminal 110, in which the application has been activated, over the electronic device such as the image forming apparatus 120 (transmission process). Here, it is preferable that the short range wireless communication 11 is performed by using a communication method such as Bluetooth (registered trademark) or NFC which is preset so that data communication is performed when the mobile terminal 110 reaches within a distance of the image forming apparatus 120 by, for example, approximately 0 cm to 20 cm, preferably approximately 0 cm to 10 cm. Accordingly, even when other electronic devices are installed in the vicinity of the electronic device such as the image forming apparatus 120, it is possible to reduce the occurrence of erroneously transmitting terminal identification information to the other electronic devices. Here, as an example, the following description will be given on the assumption that the short range wireless communication 11 is Bluetooth communication with the communication distance limited to 10 cm or less. Bluetooth communication includes Bluetooth Low Energy (BLE) communication.

The image forming apparatus 120 is an example of an electronic device having a network communication function for communicating with the information processing apparatus 100 via the communication network 10 and a short range wireless communication function for communicating with the mobile terminal 110 via the short range wireless communication 11. The electronic device according to the present embodiment may be, for example, an output device such as a projector (PJ), an Interactive White Board (IWB) having an electronic blackboard function enabling mutual communication, or a digital signage. The electronic device may be, for example, a Head Up Display (HUD) device, an industrial machine, an imaging element, a sound collector, a medical device, a network home appliance, a connected car, or the like. Further, the electronic device may be a personal computer (PC), a mobile phone, a smartphone, a tablet terminal, a video game console, Personal Digital Assistant (PDA), a digital camera, a wearable PC, a desktop PC, or the like.

As an example, the following description will be given on the assumption that the electronic device is the image forming apparatus 120 such as, for example, a Multifunction Peripheral (MFP) in which a scan function, a copy function, a printing function, a facsimile function, or the like are included in a single housing, a printer, or the like.

When the terminal identification information transmitted by the short range wireless communication 11 is received from the mobile terminal 110, the image forming apparatus 120 transmits a login request including the received terminal identification information to the information processing apparatus 100. When the login to the information processing apparatus 100 is successful, the image forming apparatus 120 allows the user 20 to use the image forming apparatus 120.

By the above-described configuration, the user 20 can log in to the information processing apparatus 100 from the electronic device by using the account information already registered in the information processing apparatus 100 without inputting the account information to an operation unit of the electronic device such as the image forming apparatus 120.

For example, the input of login information for electronic devices such as printers and projectors may be troublesome, because the display unit is small or because there is only an operation button on the operation unit, depending on the model. However, according to the present embodiment, the registered account information can be used to log in to the information processing apparatus 100 from the electronic device, regardless of the configuration of the display unit and the operation unit of the electronic device.

Further, according to the present embodiment, the user 20 can easily associate the terminal identification information of the mobile terminal 110 with the registered account information, for example, at his/her desk without going close to the electronic device such as the image forming apparatus 120.

The system configuration of the information processing system 1 illustrated in FIG. 1 is an example. For example, the functions of the information processing apparatus 100 may be provided by being distributed over a plurality of information processing apparatuses or may be implemented by a cloud service or the like. The mobile terminal 110 used by the user 20 may be a plurality of mobile terminals, such as, for example, a first mobile terminal supplied by the company and a second mobile terminal owned by an individual. Further, the information processing system 1 may include a plurality of electronic devices such as the image forming apparatus 120.

<Hardware Configuration>
(Hardware Configuration of Information Processing Apparatus)

Figure 2:
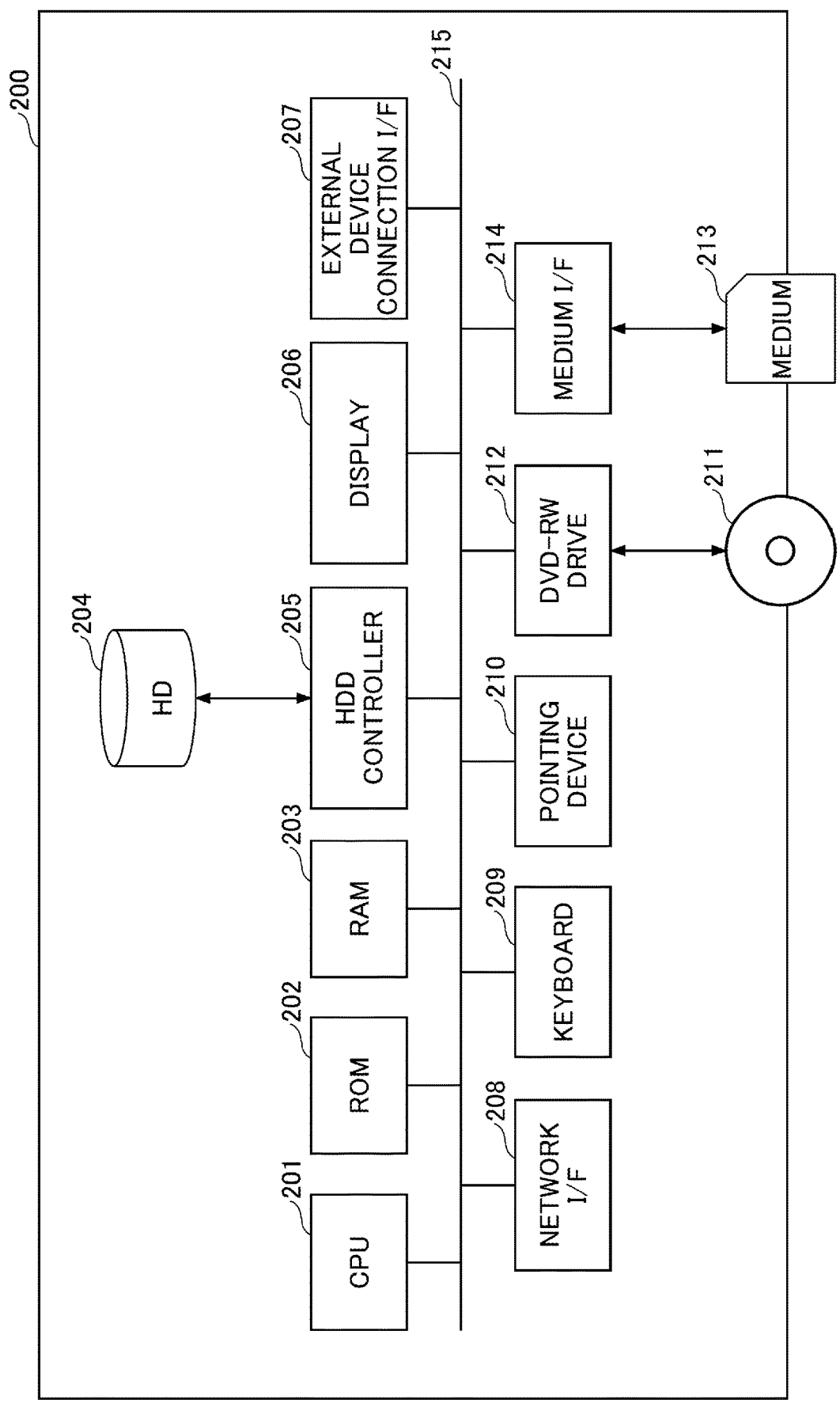
FIG. 2 is a diagram illustrating an example of a hardware configuration of a computer according to an embodiment of the present invention.

The information processing apparatus 100 has a hardware configuration of a computer 200 as illustrated in FIG. 2, for example. Alternatively, the information processing apparatus 100 may include a plurality of the computers 200.

FIG. 2 is a diagram illustrating an example of a hardware configuration of a computer according to an embodiment. The computer 200 includes, for example, a central processing unit (CPU) 201, a Read Only Memory (ROM) 202, a Random Access Memory (RA) 203, a Hard Disk (HD) 204, a Hard Disk Drive (HDD) controller 205, a display 206, an external device connection interface (I/F) 207, a network I/F 208, a keyboard 209, a pointing device 210, a Digital Versatile Disk Rewritable (DVD-RW) drive 212, a medium I/F 214, and a bus line 215.

Among these, the CPU 201 controls the overall operation of the computer 200. The ROM 202 stores a program used to activate the CPU 201, such as an Initial Program Loader (IPL). The RAM 203 is used, for example, as a work area of the CPU 201. The HD 204 stores various kinds of data such as, for example, a program. The HDD controller 205 controls the reading or writing of various kinds of data from or to the HD 204 according to the control by the CPU 201.

The display 206 displays various kinds of information, such as cursors, menus, windows, characters, or images. The external device connection I/F 207 is an interface for connecting an external device to the computer 200. The network I/F 208 is a communication interface for connecting the computer 200 to the communication network 10 or the like. The keyboard 209 is a type of input means including a plurality of keys for input of characters, numbers, various instructions, or the like. The pointing device 210 is a type of input means for selecting and executing various instructions, selecting a processing target, moving a cursor, or the like.

The DVD-RW drive 212 controls the reading or writing of various kinds of data from or to the DVD-RW 211 that is an example of a removable recording medium. The DVD-RW 211 is not limited to the DVD-RW, but may be another removable recording medium. The medium I/F 214 controls the reading or writing (storage) of data from or to a medium 213 such as, for example, a flash memory or a memory card. The bus line 215 includes an address bus, a data bus, and various control signals for electrically connecting the above-described elements.

(Hardware Configuration of Mobile Terminal)

Figure 3:
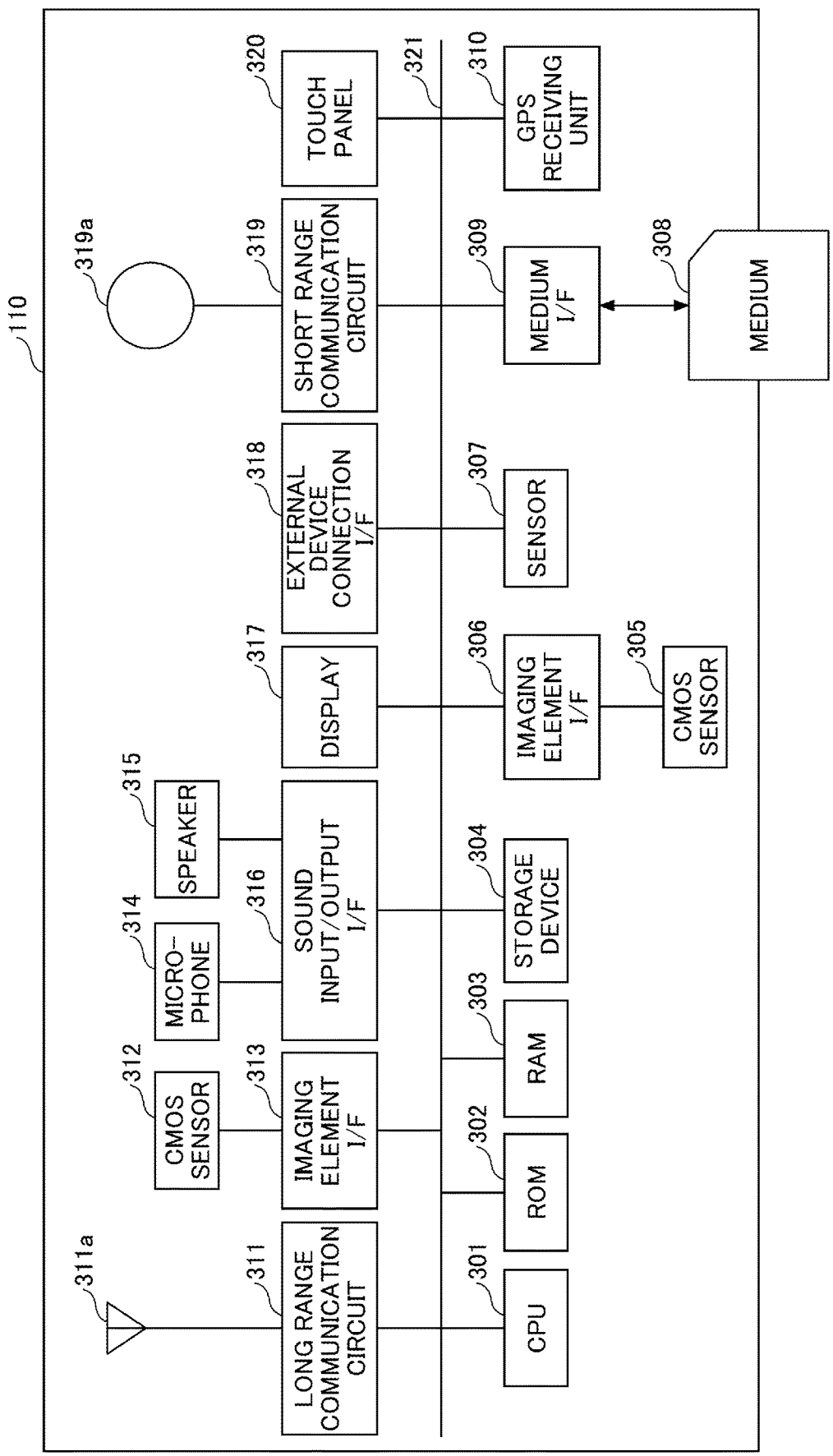
FIG. 3 is a diagram illustrating an example of a hardware configuration of a mobile terminal according to an embodiment of the present invention.

FIG. 3 is a diagram illustrating an example of a hardware configuration of a mobile terminal according to an embodiment. As illustrated in FIG. 3, the mobile terminal 110 includes a CPU 301, a ROM 302, a RAM 303, a storage device 304, a Complementary Metal Oxide Semiconductor (CMOS) sensor 305, an imaging element I/F 306, a sensor 307, a medium I/F 309, a Global Positioning System (GPS) receiving unit 310, or the like.

Among these, the CPU 301 performs overall control of the mobile terminal 110 by executing a predetermined program. The ROM 302 stores a program used for activating the CPU 301, for example, such as an IPL. The RAM 303 is used as the work area of the CPU 301. The storage device 304 is a large capacity storage device for storing programs such as an Operating System (OS), applications, and various kinds of data or the like, and is implemented by, for example, a Solid State Drive (SSD) or a flash ROM.

The CMOS sensor 305 is a type of built-in imaging means that captures a subject (mainly a self-image) and obtains image data according to the control by the CPU 301. The mobile terminal 110 may include an imaging means, such as a Charge Coupled Device (CCD) sensor, in place of the CMOS sensor 305. The imaging element I/F 306 is a circuit that controls the drive of the CMOS sensor 305. The sensor 307 includes a variety of sensors such as, for example, an electromagnetic compass that detects geomagnetic energy, a gyrocompass, and an acceleration sensor. The medium I/F 309 controls the reading or writing of data from or to a medium (storage medium) 308 such as a flash memory. The GPS receiving unit 310 receives a GPS signal from a GPS satellite.

The mobile terminal 110 includes a long range communication circuit 311, an antenna 311a for the long range communication circuit 311, a CMOS sensor 312, an imaging element I/F 313, a microphone 314, a speaker 315, a sound input/output I/F 316, a display 317, an external device connection I/F 318, a short range communication circuit 319, an antenna 319a for the short range communication circuit 319, and a touch panel 320.

Among these, the long range communication circuit 311 is a communication interface for connecting the mobile terminal 110 to the communication network 10. The CMOS sensor 312 is a type of built-in imaging means that captures a subject according to the control by the CPU 301 and obtains image data. The imaging element I/F 313 is a circuit that controls the drive of the CMOS sensor 312. The microphone 314 is a built-in circuit that converts sound to an electrical signal. The speaker 315 is a built-in circuit that converts electrical signals into physical vibrations to produce sound, such as music and voice sound. The sound input/output I/F 316 is a circuit that processes the input and output of sound signals between the microphone 314 and the speaker 315 according to the control by the CPU 301.

The display 317 is a type of display means such as a liquid crystal display or an organic Electro Luminescent (EL) display for displaying an image of a subject or various icons. The external device connection I/F 318 is an interface for connecting an external device (e.g., a Universal Serial Bus (USB) memory) to the mobile terminal 110. The short range communication circuit 319 is a circuit for performing short range wireless communication, such as Bluetooth, NFC, or the like. The touch panel 320 is a type of input means for operating the mobile terminal 110 when a user presses the display 317.

The mobile terminal 110 includes a bus line 321. The bus line 321 includes an address bus, a data bus, and various control signals for electrically connecting the elements connected to the bus line 321, as illustrated in FIG. 3.

(Hardware Configuration of Image Forming Apparatus)

Here, an example of the hardware configuration of the image forming apparatus 120, which is an example of an electronic device, will be described.

Figure 4:
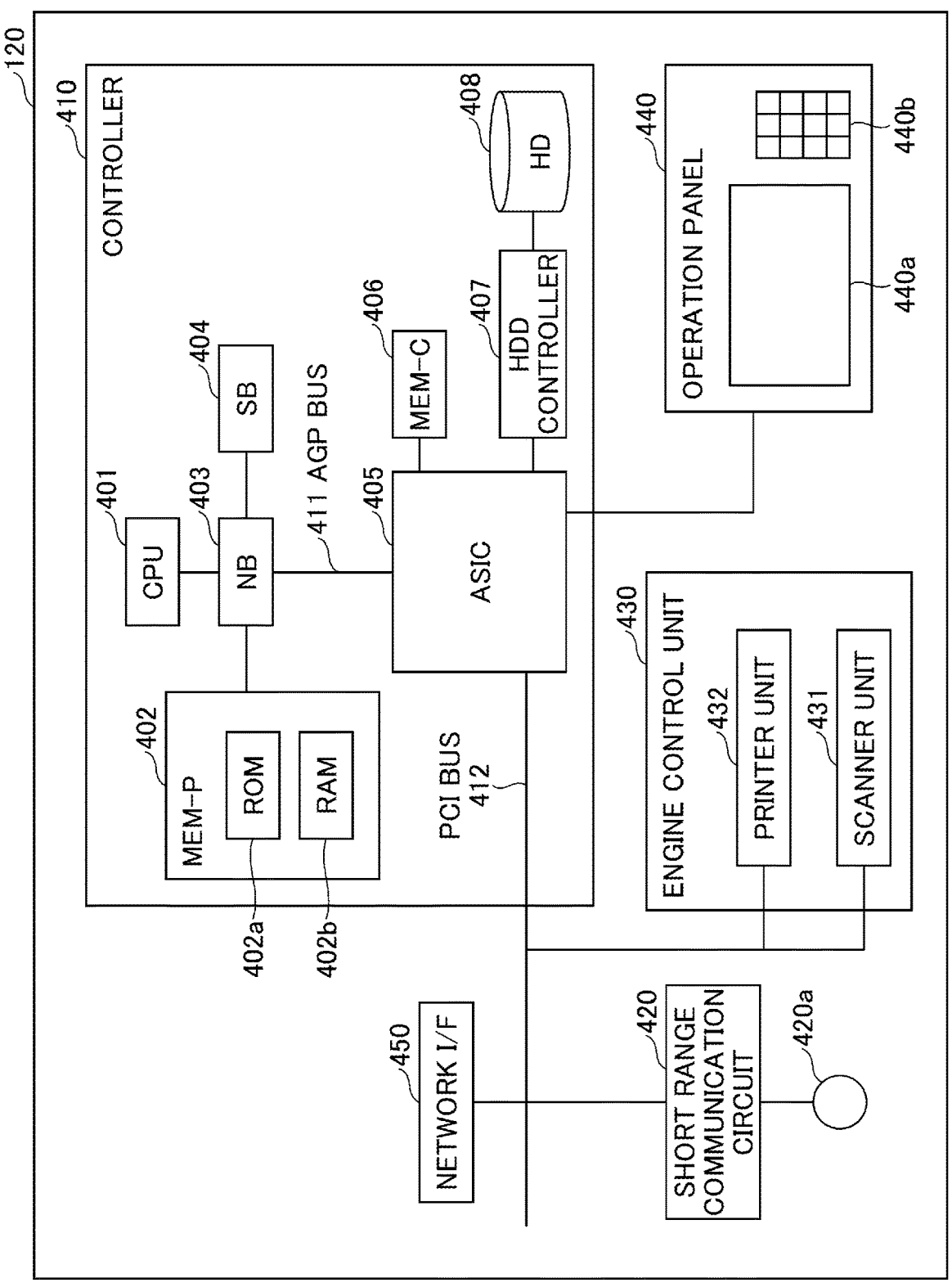
FIG. 4 is a diagram illustrating an example of a hardware configuration of an image forming apparatus according to an embodiment of the present invention.

FIG. 4 is a diagram illustrating an example of a hardware configuration of an image forming apparatus according to an embodiment. The image forming apparatus 120 includes, for example, a controller 410, a short range communication circuit 420, an engine control unit 430, an operation panel 440, and a network I/F 450 as illustrated in FIG. 4.

Among these, the controller 410 includes a CPU 401, a system memory (MEM-P) 402, a north bridge (NB) 403, a south bridge (SB) 404, an Application Specific Integrated Circuit (ASIC) 405, a local memory (MEM-C) 406, an HDD controller 407, and a HD 408, which are the main units of a computer, in which the NB 403 and the ASIC 405 are connected by an Accelerated Graphics Port (AGP) bus 411.

Among these, the CPU 401 is a computing unit that performs the overall control of the image forming apparatus 120 by executing a predetermined program. The NB 403 is a bridge for connecting the CPU 401 with the MEM-P 402, the SB 404, and the AGP bus 411, and includes a memory controller for controlling reading or writing from or to the MEM-P 402, a Peripheral Element Interconnect (PCI) master, and an AGP target.

The MEM-P 402 includes a ROM 402a, which is a memory for storing programs and data by which each function of the controller 410 is implemented, and a RAM 402b, which is used for loading a program or data, a rendering memory at the time of memory printing, or the like. The program stored in the RAM 402b may be provided by being recorded in a computer-readable recording medium such as a compact disk read-only memory (CD-ROM), a CD recordable (CD-R), or a digital versatile disc (DVD) in an installable format or an executable format file.

The SB 404 is a bridge for connecting the NB 403 to PCI devices and peripheral devices. The ASIC 405 is an integrated circuit (IC) for image processing applications having hardware elements for image processing, and serves as a bridge connecting the AGP bus 411, a PCI bus 412, the HDD controller 407, and the MEM-C 406. The ASIC 405 includes a PCI target and an AGP master, an arbiter (ARB) that forms the core of the ASIC 405, a memory controller that controls the MEM-C 406, a plurality of Direct Memory Access Controllers (DMACs) that rotate image data by hardware logic, and the like, and a PCI unit that transfers data between a scanner unit 431 and a printer unit 432 via the PCI bus 412.

The MEM-C 406 is a local memory used as a copy image buffer and a code buffer. The HD 408 is a storage for storing image data, storing font data used for printing, and storing forms. For example, the HD 408 may store a program such as an OS, an application, a device driver, or various kinds of data. The HDD controller 407 controls the reading or writing of data from or to the HD 408 in accordance with the control by the CPU 401. The AGP bus 411 is a proposed bus interface for graphics accelerator cards to speed up graphics processing, and by directly accessing the MEM-P 402 with high throughput, the graphics accelerator card can be made faster.

The short range communication circuit 420 performs a variety of short range wireless communications, such as Bluetooth or NFC, using an antenna 420a or the like for the short range communication circuit. The engine control unit 430 includes, for example, the scanner unit 431 and the printer unit 432. The scanner unit 431 is a reading device for reading a document or the like. The printer unit 432 is a printing device that prints the printing data to a printing medium. The scanner unit 431 or the printer unit 432 includes image processing portions for error diffusion, gamma conversion, and the like.

The operation panel 440 includes a panel display unit 440a such as a touch panel for displaying a current setting value, a selection screen, or the like, and receiving input from the operator, and includes operation buttons 440b including a numeric pad for receiving a set value of an image forming condition such as a density setting condition, a start key for receiving a copy start instruction, or the like. The controller 410 performs the overall control of the image forming apparatus 120 and controls, for example, rendering, communication, input from the operation panel 440, or the like.

The network I/F 450 is an interface for performing data communication using the communication network 10. The short range communication circuit 420 and the network I/F 450 are electrically connected to the ASIC 405, for example, via the PCI bus 412.

The image forming apparatus 120 is an example of an electronic device. As long as the electronic device includes a computer configuration, the network I/F 450, the short range communication circuit 420, and the antenna 420a, other hardware configurations may be optional.

First Embodiment

<Functional Configuration>

FIG. 5 is a diagram illustrating an example of a functional configuration of an information processing system according to the first embodiment.

(Functional Configuration of Information Processing Apparatus)

The information processing apparatus 100 implements the functional configuration of the information processing apparatus 100 illustrated in FIG. 5, for example, by executing predetermined programs on the computer 200 illustrated in FIG. 2 or a plurality of computers 200. At least some of the functional configurations of the information processing apparatus 100 may be implemented by hardware. In the example of FIG. 5, the information processing apparatus 100 includes a communication unit 501, a first managing unit 502, a first login request receiving unit 503, a first authenticating unit 504, a registration information transmitting unit 505, a second managing unit 506, a second login request receiving unit 507, a second authenticating unit 508, and a storage unit 509.

The communication unit 501, for example, connects the information processing apparatus 100 to the communication network 10 using the network I/F 208 illustrated in FIG. 2 and performs a communication process to communicate with the mobile terminal 110 and other devices such as the image forming apparatus 120.

The first managing unit 502 performs the first management process of managing the account information including the login information of the user 20 previously registered in the information processing apparatus 100 (or the information processing system 1). For example, the first managing unit 502 stores and manages account information 510 as illustrated in FIGS. 6A and 6B in the storage unit 509 or the like. The first managing unit 502 may store and manage the account information 510 in an external storage server or the like.

FIG. 6A illustrates an image of an example of the account information 510 managed by the first managing unit 502. In the example of FIG. 6A, the account information 510 includes information such as "user ID", "password", "user name", "terminal identification information", "state", and the like, as items. The "user ID" is a login ID used by the user 20 registered in the information processing apparatus 100 in order to log in to the information processing apparatus 100. The user 20 is not limited to an individual, and may include a plurality of users, for example, tenants, a group, a department, or the like. In the example of FIG. 6A, the e-mail address of the user 20 is used as the user ID. A "password" is a password corresponding to the user ID. The user ID and password are examples of the login information of the user 20. The user ID may be a login ID other than the e-mail address. The password may be authentication information other than the password.

The "user name" is information indicating the name or the like of the user 20. The account information 510 may include various kinds of information relating to the user 20 in addition to the user name, such as, for example, the employee ID or affiliation information of the user 20. The "terminal identification information" is terminal identification information that identifies the mobile terminal 110 used by the user 20. The second managing unit 506 or the like, which will be described later, registers the terminal identification information in the account information 510. The "state" is information indicating whether the mobile terminal 110 is logged in or is not logged in to (logged out of) the information processing apparatus 100.

Note that, in the "terminal identification information", two or more terminal pieces of identification information may be registered for each user 20, as in the account information 510 illustrated in FIG. 6B. Thus, for example, the user 20 can register terminal identification information of a plurality of mobile terminals, such as the first mobile terminal supplied by the company and the second mobile terminal owned by an individual, in the information processing apparatus 100. In short, the account information 510 may be stored by associating a predetermined number of pieces of terminal identification information by association with the account information of the user 20.

The first login request receiving unit 503 executes a first login request reception process in which a login request (hereinafter, referred to as a first login request) including the user's login information (for example, the user ID and the password) is received from the mobile terminal 110.

The first authenticating unit 504 compares the login information included in the first login request received by the first login request receiving unit 503 with the login information included in the account information 510 and performs a first authentication process to allow login from the mobile terminal 110. For example, when the combination of the user ID and the password included in the first login information is stored in the account information 510, the first authenticating unit 504 allows the login from the mobile terminal 110. On the other hand, when the combination of the user ID and the password included in the first login information is not stored in the account information 510, the first authenticating unit 504 rejects the login from the mobile terminal 110.

The registration information transmitting unit 505 performs a registration information transmitting process for transmitting the registration information to a transmission destination corresponding to the account information of the user 20 of the mobile terminal 110 in response to a request from the mobile terminal 110 that is allowed to log in. For example, the registration information transmitting unit 505 transmits a registration application screen that receives a registration application to register the terminal identification information of the mobile terminal 110, to the mobile terminal 110 that is allowed to log in, to be displayed. When the registration application information transmitted from the mobile terminal 110 is received according to the registration application operation by the user 20, the registration information transmitting unit 505 transmits the registration information including the information necessary for the registration of the terminal identification information to the e-mail address of the user 20.

When the terminal identification information of the mobile terminal 110 (the identification information unique to the mobile terminal 110) is received from the mobile terminal 110 that is allowed to log in, the second managing unit 506 performs the second management process of associating the received terminal identification information with the account information of the user 20. For example, when the registration request including the terminal identification information is received from the mobile terminal 110 that is allowed to log in, the second managing unit 506 stores the terminal identification information included in the registration request in the account information 510 as illustrated in FIG. 6A or FIG. 6B. The functions of the first managing unit 502 and the second managing unit 506 may be implemented, for example, by one account information management unit 511.

The second login request receiving unit 507 executes the second login request reception process in which the login request including the terminal identification information of the mobile terminal 110 (hereinafter, referred to as the second login request) is received from an electronic device such as the image forming apparatus 120 or the like. The functions of the first login request receiving unit 503 and the second login request receiving unit 507 may be implemented, for example, by a single login request receiving unit 512 or the like.

The second authenticating unit 508 compares the terminal identification information included in the second login request received by the second login request receiving unit 507 with the terminal identification information associated with the account information and performs the second authentication process of allowing login from the image forming apparatus 120 or the like. For example, when the terminal identification information included in the second login request is stored in the account information 510 as illustrated in FIG. 6A or FIG. 6B, the second authenticating unit 508 allows the login from an electronic device such as the image forming apparatus 120 or the like. On the other hand, when the terminal identification information included in the second login request is not stored in the account information 510, the second authenticating unit 508 rejects the login from the electronic device, such as the image forming apparatus 120 or the like. For example, the functions of the first authenticating unit 504 and the second authenticating unit 508 may be implemented by a single authenticating unit 513 or the like.

The storage unit 509 is implemented, for example, by a program executed by the CPU 201, the HD 204, and the HDD controller 205 of FIG. 2, and stores various kinds of information such as the account information 510, data, programs, or the like.

(Functional Configuration of Mobile Terminal)

For example, the mobile terminal 110 executes a predetermined program (application) by the CPU 301 of FIG. 3, thereby implementing the functional configuration of the mobile terminal 110 as illustrated in FIG. 5. At least a portion of each functional configuration of the mobile terminal 110 may be implemented by hardware. In the example of FIG. 5, the mobile terminal 110 includes a communication unit 521, a short range wireless communication unit 522, a login requesting unit 523, an acquiring unit 524, a first identification information transmitting unit 525, a second identification information transmitting unit 526, a display control unit 527, and a storage unit 528.

For example, the communication unit 521 connects the mobile terminal 110 to the communication network 10 by using the long range communication circuit 311 and the antenna 311a of FIG. 3 and performs a communication process for communicating with other devices such as the information processing apparatus 100.

For example, the short range wireless communication unit 522 performs a short range wireless communication process of transmitting terminal identification information of the mobile terminal 110 to an electronic device such as the image forming apparatus 120 within a predetermined distance from the mobile terminal 110 by using the short range communication circuit 319 and the antenna 319a of FIG. 3.

The login requesting unit 523 performs a login request process for requesting login from the mobile terminal 110 to the information processing apparatus 100 by using the login information (for example, the user ID and the password) of the user 20, in accordance with an operation by the user 20.

The acquiring unit 524 performs an acquisition process for acquiring the terminal identification information unique to the mobile terminal 110. For example, the acquiring unit 524 acquires the UUID of the mobile terminal 110 or the UUID of the application as terminal identification information.

The first identification information transmitting unit 525 performs a first identification information transmission process in which the terminal identification information acquired by the acquiring unit 524 is transmitted to the information processing apparatus 100, in accordance with a registration operation by the user 20.

The second identification information transmission unit 526 performs a second identification information transmission process of transmitting the terminal identification information of the mobile terminal 110 to an electronic device, such as the image forming apparatus 120, by using the short range wireless communication unit 522. For example, the second identification information transmission unit 526 transmits terminal identification information of the mobile terminal 110 to the image forming apparatus 120 by the short range wireless communication 11 when the user 20 brings the mobile terminal 110 close to the image forming apparatus 120 within a predetermined distance.

The display control unit 527 causes a display unit, such as the display 317 of FIG. 3, to display a display screen, such as a login screen, a registration application screen, a registration screen, or a registration completion screen, which will be described later, and receives operations by the user 20 with respect to the display screen.

The storage unit 528 is implemented by, for example, a program executed by the CPU 301 and a storage device 304 of FIG. 3, and stores various kinds of information such as terminal identification information of the mobile terminal 110, data, programs, or the like.

(Functional Configuration of Image Forming Apparatus)

The image forming apparatus 120 implements, for example, a communication unit 531, a short range wireless communication unit 532, a login requesting unit 533, an image forming processing unit 534, and a storage unit 535 by executing a predetermined program by the CPU 401 of FIG. 4. At least a portion of each of the above-described functional configurations may be implemented by hardware.

For example, the communication unit 531 connects the image forming apparatus 120 to the communication network 10 by using the network I/F 450 of FIG. 4 and communicates with other devices such as the information processing apparatus 100.

The short range wireless communication unit 532 receives terminal identification information transmitted from the mobile terminal 110 by the short range wireless communication 11 by using, for example, the short range communication circuit 420 and the antenna 420a of FIG. 4.

When the short range wireless communication unit 532 receives the terminal identification information from the mobile terminal 110, the login requesting unit 533 transmits a login request including the received terminal identification information to the information processing apparatus 100.

The image forming processing unit 534 controls an image forming process such as printing, scanning, copying, or fax transmission by using, for example, the engine control unit 430 of FIG. 4. When login is allowed by the information processing apparatus 100 in response to the login request transmitted by the login requesting unit 533, the image forming processing unit 534 allows the user 20 to use the image forming apparatus 120 (to use an image forming process).

The storage unit 535 is implemented by, for example, a program executed by the CPU 401, the HD 408, and the HDD controller 407 of FIG. 4, and stores various kinds of data, information, programs, or the like.

The functional configuration of the information processing system 1 illustrated in FIG. 5 is an example. For example, each functional configuration of the information processing apparatus 100 may be distributed over a plurality of the computers 200.

<Process Flow>

Next, the flow of process of the information processing method according to the first embodiment will be described.

(Process of Information Processing System)

FIG. 7 is a diagram illustrating an example of a process of an information processing system according to the first embodiment. This illustrates an example of a process in which the user 20 for which the account information has already been registered in the information processing apparatus 100, registers the terminal identification information of the mobile terminal 110 in the information processing apparatus 100 (associating the terminal identification information with the account information).

In step S701, the user 20 performs a start operation on the mobile terminal 110. For example, the user 20 activates an application corresponding to the information processing system 1 installed in the mobile terminal 110. Alternatively, the user 20 selects a start button or the like on an application screen.

In step S702, the login requesting unit 523 of the mobile terminal 110 transmits a connection request to the information processing apparatus 100 according to the start operation by the user 20. For example, the login requesting unit 523 requests connection to a predetermined Uniform Resource Locator (URL) for connecting to the information processing apparatus 100.

In step S703, when the connection request from the mobile terminal 110 is received, the first login request receiving unit 503 of the information processing apparatus 100 transmits a login screen to the mobile terminal 110. Accordingly, in step S704, the display control unit 527 of the mobile terminal 110 displays, for example, a login screen 810 as illustrated in FIG. 8A on a display unit, such as the display 317.

Figure 8A:
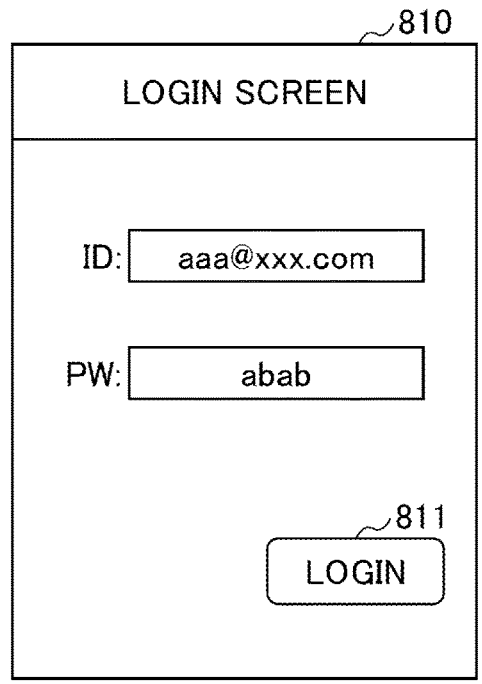
FIGS. 8A to 8D are diagrams illustrating an example of a display screen of a mobile terminal according to the first embodiment of the present invention.

FIG. 8A illustrates an example of the login screen 810 displayed by the mobile terminal 110. For example, the user 20 may perform a login operation by inputting the user ID and password on the login screen 810 and selecting a "login" button 811. When the user 20 has already logged in to the information processing apparatus 100 from the mobile terminal 110, the user ID and the password may be automatically input.

In step S705, when the user 20 performs a login operation, in step S706, the login requesting unit 523 of the mobile terminal 110 transmits a first login request including the user ID (an e-mail address as an example) and a password to the information processing apparatus 100.

In step S707, when the first login request receiving unit 503 of the information processing apparatus 100 receives the first login request from the mobile terminal 110, the first authenticating unit 504 performs an authentication process based on the login information included in the account information 510. For example, when the combination of the user ID (e.g., the e-mail address) and the password included in the first login request is stored in the account information 510, the first authenticating unit 504 allows the login from the mobile terminal 110. On the other hand, when the combination of the user ID and the password included in the first login information is not stored in the account information 510, the first authenticating unit 504 rejects the login from the mobile terminal 110. Here, the following description will be given, assuming that the account information of the user 20 is already registered as the information processing apparatus 100 and login from the mobile terminal 110 is allowed.

In step S708, the first authenticating unit 504 of the information processing apparatus 100 allows login from the mobile terminal 110, and the registration information transmitting unit 505 transmits a registration application screen to the mobile terminal 110 for which login has been allowed. Accordingly, in step S709, the display control unit 527 of the mobile terminal 110 displays, for example, a registration application screen 820 as illustrated in FIG. 8B on a display unit, such as the display 317.

Figure 8B:
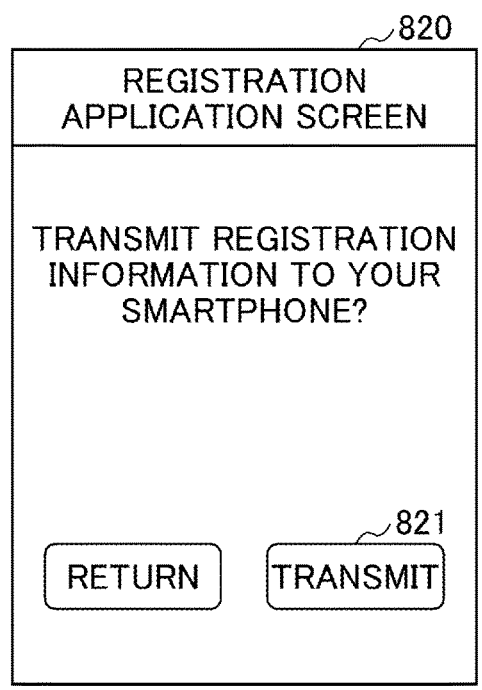

FIG. 8B illustrates an example of the registration application screen 820 displayed by the mobile terminal 110. For example, the user 20 may perform the registration application operation by selecting a "transmit" button 821 in the registration application screen 820.

In step S710, when the user 20 performs the registration application operation, in step S711, the display control unit 527 of the mobile terminal 110 transmits the registration application information indicating that the transmission button is selected to the information processing apparatus 100.

In step S712, when the registration application information transmitted from the mobile terminal 110 is received, the registration information transmitting unit 505 of the information processing apparatus 100 transmits the registration information including the information necessary for the registration of the terminal identification information to the e-mail address of the user 20.

In step S713, the display control unit 527 of the mobile terminal 110 displays a registration screen for registering the terminal identification information of the mobile terminal 110 in the information processing apparatus 100, based on the registration information transmitted by the information processing apparatus 100 by e-mail. For example, the display control unit 527 displays a registration screen 830 as illustrated in FIG. 8C on a display unit, such as the display 317, in accordance with an operation by the user 20 of selecting the URL included in the e-mail received from the information processing apparatus 100.

Figure 8C:
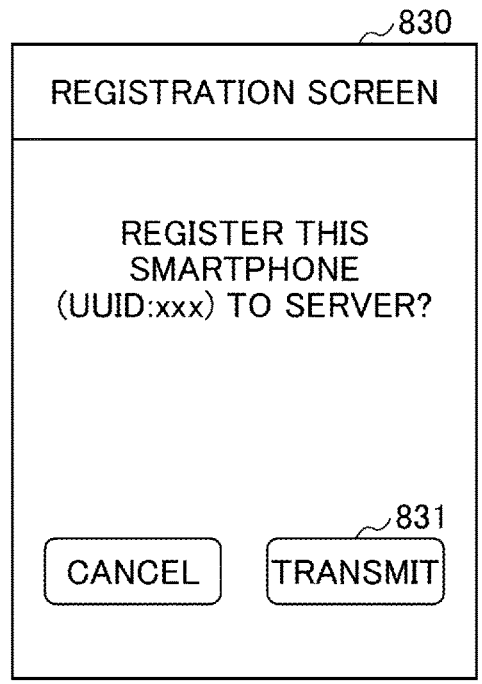

FIG. 8C illustrates an example of the registration screen 830 displayed by the mobile terminal 110. For example, the user 20 may perform a registration operation of requesting registration of the terminal identification information of the mobile terminal 110 by selecting a "transmit" button 831 on the registration screen 830. The display control unit 527 may acquire the terminal identification information (identification information) of the mobile terminal 110 by using the acquiring unit 524 and display the terminal identification information (for example, the UUID) of the mobile terminal 110 on the registration screen 830 as illustrated in FIG. 8C.

As another example, the acquiring unit 524 of the mobile terminal 110 may acquire the terminal identification information (identification information) of the mobile terminal 110 when the first identification information transmitting unit 525 transmits the registration request to the information processing apparatus 100 in step S715.

In step S714, when the user 20 performs a registration operation, in step S715, the display control unit 527 of the mobile terminal 110 transmits a registration request indicating that the transmit button is selected, to the information processing apparatus 100. The registration request includes at least the terminal identification information of the mobile terminal 110 acquired by the acquiring unit 524.

In step S716, when the registration request is received from the mobile terminal 110, the second managing unit 506 of the information processing apparatus 100 associates the terminal identification information included in the registration request with the account information of the user 20 of the mobile terminal 110. For example, when the account information 510 illustrated in FIG. 6A is stored in the storage unit 509, it is assumed that the second managing unit 506 receives the registration request from the mobile terminal 110 used by the user 20 of the user name "user B". In this case, in the account information 510 illustrated in FIG. 6A, the second managing unit 506 stores the terminal identification information included in the registration request in a column of "terminal identification information" corresponding to the account information of the user name "user B".

Figure 8D:
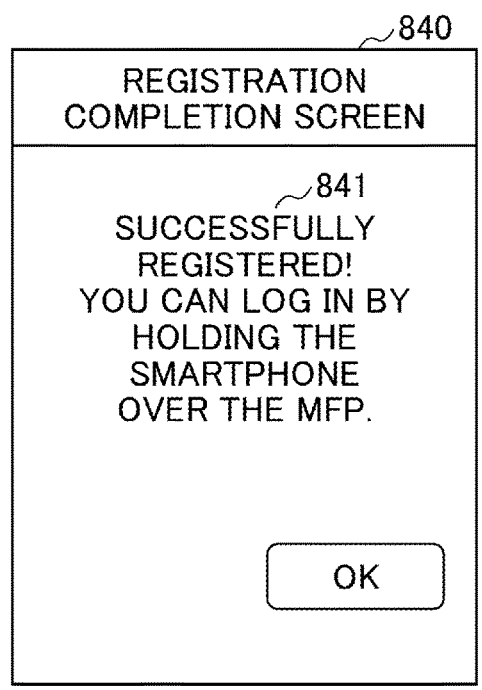

In step S717, the second managing unit 506 of the information processing apparatus 100 transmits the registration completion report indicating that the registration is completed to the mobile terminal 110. Accordingly, in step S718, the display control unit 527 of the mobile terminal 110 displays a registration completion screen 840, for example, illustrated in FIG. 8D, on a display unit, such as the display 317. Preferably, as illustrated in FIG. 8D, the display control unit 527 displays a message on the registration completion screen 840 indicating that login can be performed by holding a smartphone (the mobile terminal 110) over the multifunction peripheral (MFP, the image forming apparatus 120) (for example, brought close to a distance of about 10 cm or less).

After the above-described process is completed, for example, in step S721 of FIG. 7, when the user 20 brings the mobile terminal 110 close to the image forming apparatus 120, the information processing system 1 performs the process from step S722.

In step S722, the second identification information transmission unit 526 of the mobile terminal 110 transmits terminal identification information (identification information) of the mobile terminal 110 to the image forming apparatus 120 by using the short range wireless communication unit 522.

In step S723, when the short range wireless communication unit 532 of the image forming apparatus 120 receives the terminal identification information from the mobile terminal 110, the login requesting unit 533 transmits the second login request including the received terminal identification information to the information processing apparatus 100.

In step S724, when the second login request receiving unit 507 of the information processing apparatus 100 receives the second login request from the image forming apparatus 120, the second authenticating unit 508 performs an authentication process based on the terminal identification information included in the account information 510. For example, when the terminal identification information included in the second login request received from the image forming apparatus 120 is registered in the account information 510, the second authenticating unit 508 allows the login from the image forming apparatus 120. On the other hand, when the terminal identification information included in the second login request received from the image forming apparatus 120 is not registered in the account information 510, the second authenticating unit 508 rejects the login from the image forming apparatus 120.

Here, the terminal identification information included in the second login request is already registered in the account information 510, and, therefore, in step S725, the second authenticating unit 508 allows the login from the image forming apparatus 120 that has transmitted the second login request.

In step S726, when login from the information processing apparatus 100 is allowed, the image forming processing unit 534 of the image forming apparatus 120 allows the usage of the image forming apparatus 120 (image forming process) by the user 20.

The processing of the steps S721 to S726 of FIG. 7 may be performed at any time after the processes of S701 to S718 are performed one or more times. The user 20 may also use another electronic device included in the information processing system 1, by holding the mobile terminal 110 over the other electronic device.

(Process of Information Processing Apparatus)

Figure 9:
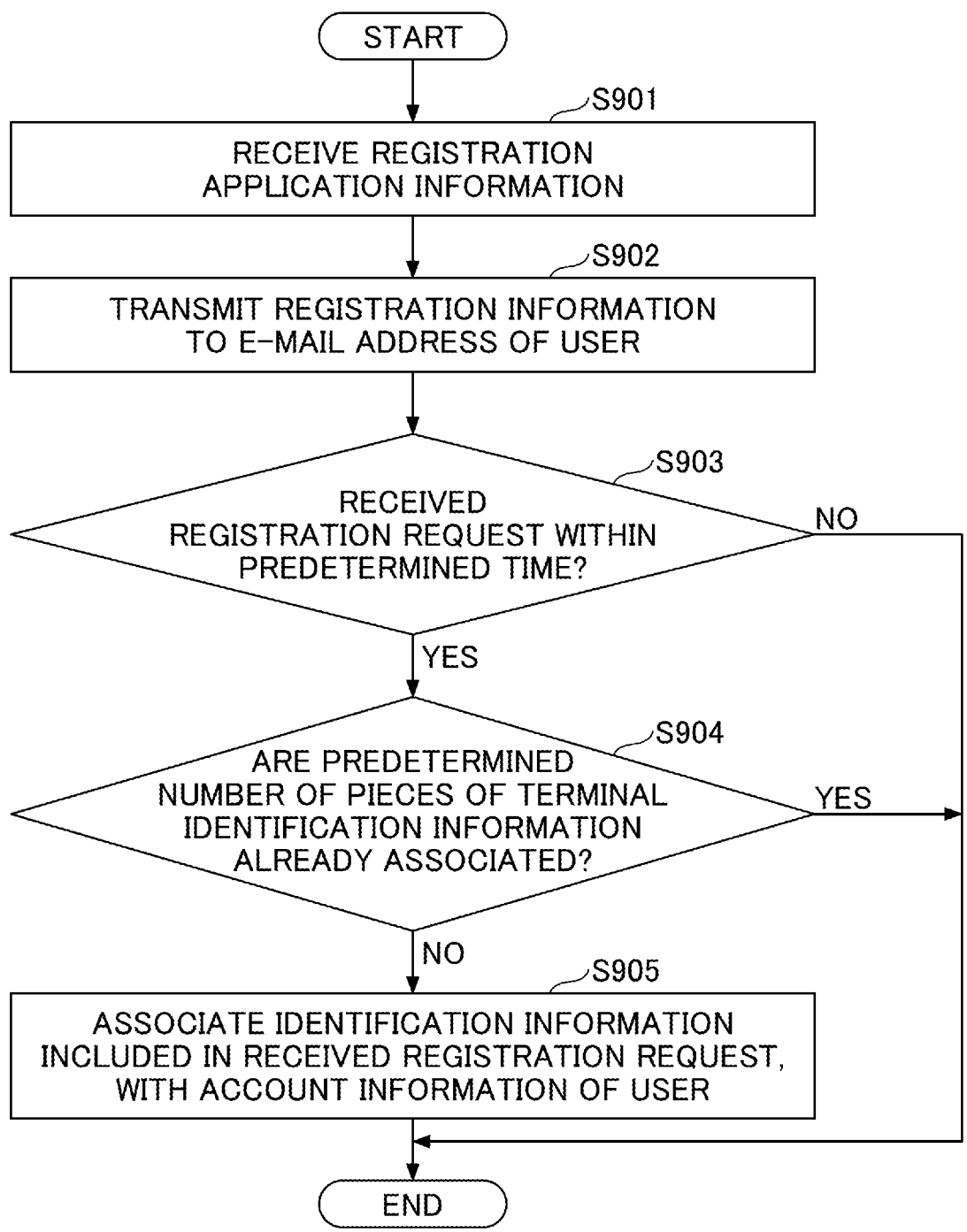
FIG. 9 is a flowchart illustrating an example of a process by an information processing apparatus according to the first embodiment of the present invention.

FIG. 9 is a flowchart illustrating an example of a process by an information processing apparatus according to the first embodiment. This process illustrates an example of a process of registering the terminal identification information executed by the information processing apparatus 100.

In step S901, when the registration information transmitting unit 505 of the information processing apparatus 100 receives the registration application information from the mobile terminal 110 that has already logged in, the information processing apparatus 100 executes the processes from step S902.

In step S902, the registration information transmitting unit 505 of the information processing apparatus 100 transmits the registration information to the e-mail address of the user 20. Note that, for example, this process corresponds to the process of step S712 in FIG. 7.

In step S903, the registration information transmitting unit 505 determines whether a registration request including the terminal identification information (identification information) of the mobile terminal 110 is received within a predetermined time after transmitting the registration information to the e-mail address of the user 20. When the registration request is received within a predetermined time, the registration information transmitting unit 505 proceeds to the process in step S904.

On the other hand, when the registration request is not received within a predetermined time, the registration information transmitting unit 505 ends the process illustrated in FIG. 9. Accordingly, the information processing apparatus 100 can disregard the registration request of the terminal identification information from any invalid mobile terminal.

When the process proceeds to step S904, the second managing unit 506 of the information processing apparatus 100 determines whether a predetermined number of pieces of terminal identification information are already associated with the account information of the user 20 of the mobile terminal 110. For example, in the account information 510 illustrated in FIG. 6A, a predetermined number of pieces, namely "one piece" of the terminal identification information is associated with the column of "terminal identification information" corresponding to the user name "user A". Therefore, when the registration information is received from the mobile terminal 110 that has logged in to the information processing apparatus 100 with the login information corresponding to the user name "user A", the second managing unit 506 determines that a predetermined number of pieces of terminal identification information have already been associated with the account information.

On the other hand, in the account information 510 illustrated in FIG. 6A, the predetermined number of pieces, namely "one piece" of the terminal identification information is not associated with the column of "terminal identification information" corresponding to the user name "user B". Therefore, when the registration information is received from another mobile terminal 110 that has logged in to the information processing apparatus 100 with the login information corresponding to the user name "user B", the second managing unit 506 determines that the predetermined number of pieces of terminal identification information are not associated with the account information.

When the predetermined number of pieces of terminal identification information are not associated with the account information, the second managing unit 506 executes the process of step S905. On the other hand, when a predetermined number of pieces of the terminal identification information are already associated with the account information, the second managing unit 506 cancels the execution of the process in step S905 and ends the process in FIG. 9.

In step S905, the second managing unit 506 stores the terminal identification information included in the received registration request, in association with the account information of the user 20 of the mobile terminal 110. Note that, for example, this process corresponds to the process of step S716 of FIG. 7. By the processes of the steps S904 and S905, the information processing apparatus 100 can manage the number of pieces of terminal identification information to be associated with the account information.

By each of the above-described processes, according to the first embodiment, the account information already registered in the information processing apparatus 100 can be used to log in to the information processing apparatus 100 from the electronic device without inputting the account information to an operation unit of the electronic device such as the image forming apparatus 120.

Each of the above-described processes is an example and can be modified or applied in various ways. For example, the display control unit 527 of the mobile terminal 110 may display the registration screen 830 as illustrated in FIG. 8C on the display unit, without having an e-mail transmitted from the information processing apparatus 100.

Second Embodiment

In the second embodiment, an example of a case in which the display control unit 527 of the mobile terminal 110 creates the registration screen 830, for example, as illustrated in FIG. 8C, without having an e-mail transmitted from the information processing apparatus 100, will be described.
<Functional Configuration>

Figure 10:
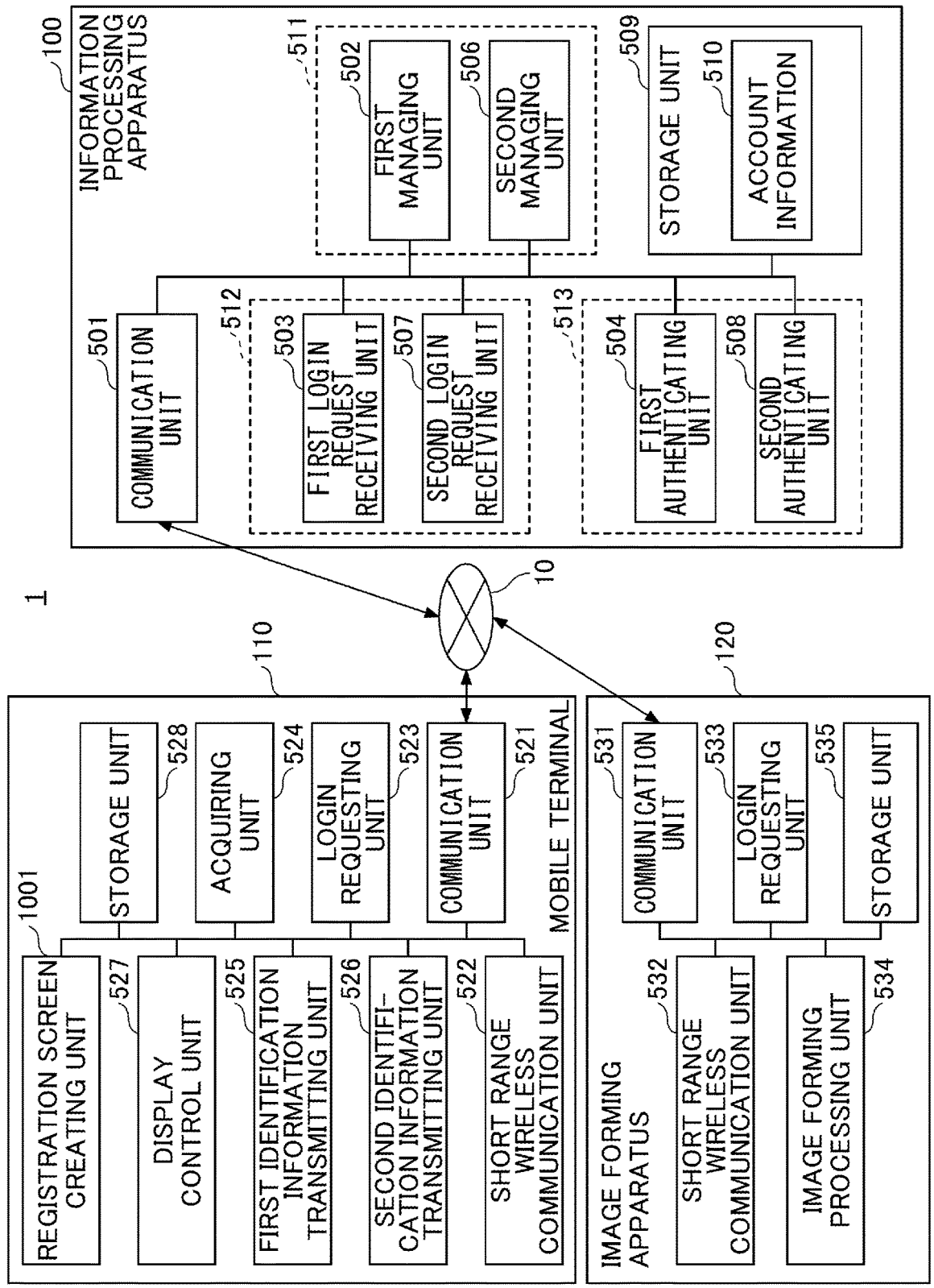
FIG. 10 is a diagram illustrating an example of a functional configuration of an information processing system according to a second embodiment of the present invention.

FIG. 10 is a diagram illustrating an example of a functional configuration of an information processing system according to a second embodiment. As illustrated in FIG. 10, the information processing apparatus 100 according to the second embodiment does not need to include the registration information transmitting unit 505 that is provided in the information processing apparatus 100 according to the first embodiment described in FIG. 5. The mobile terminal 110 according to the second embodiment includes a registration screen creating unit 1001 in addition to the functional configuration of the mobile terminal 110 according to the first embodiment described with reference to FIG. 5.

The registration screen creating unit 1001 is implemented, for example, by a program (an application) executed by the CPU 301 of FIG. 3, and creates the registration screen 830 as illustrated in FIG. 8C. The functional configuration of the information processing system 1 other than that relating to the registration information transmitting unit 505 and the registration screen creating unit 1001 may be the same as the functional configuration of the information processing system 1 according to the first embodiment described in FIG. 5.
<Process Flow>

Figure 11:
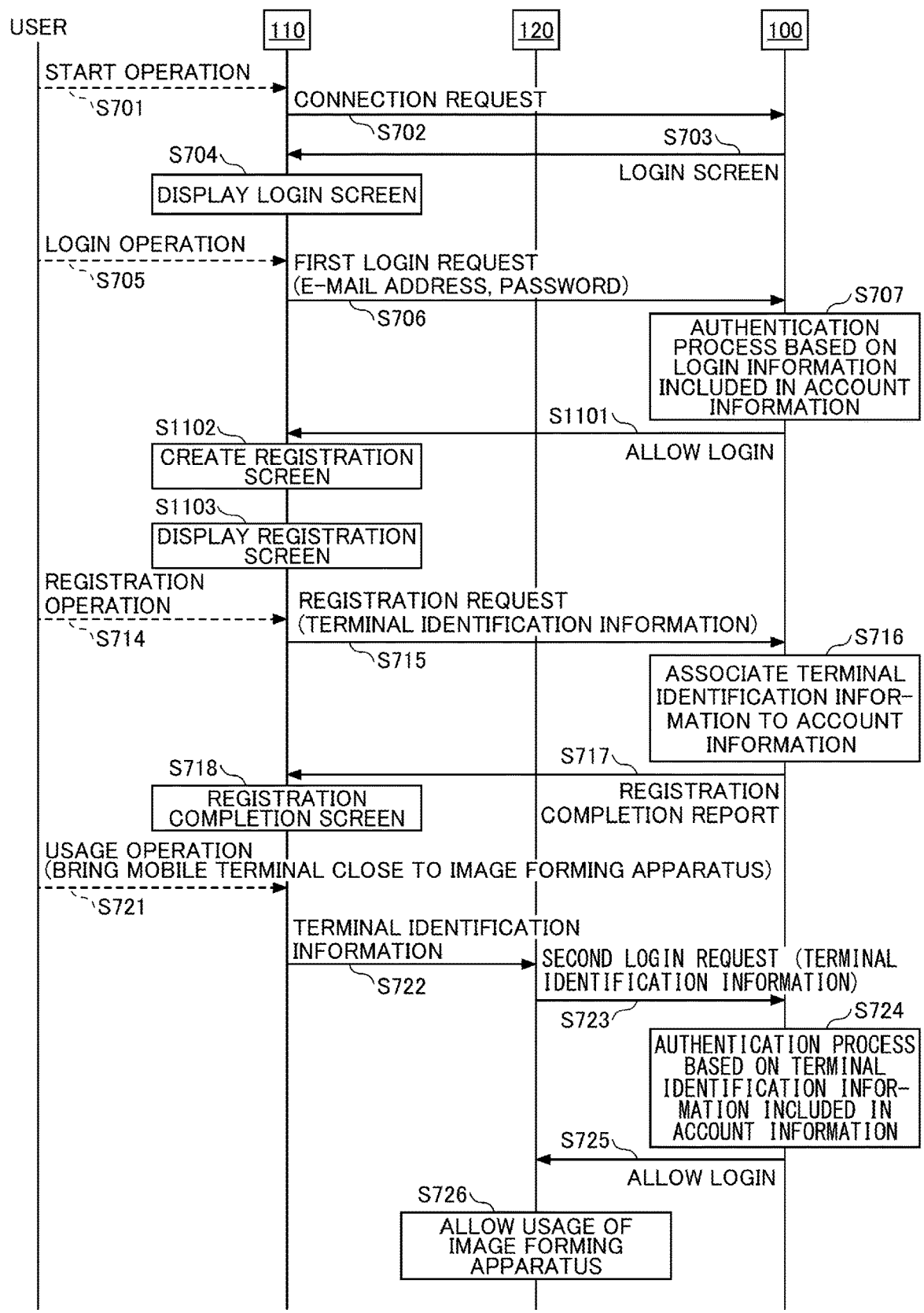
FIG. 11 is a sequence diagram illustrating an example of a process by an information processing system according to the second embodiment of the present invention.

FIG. 11 is a diagram illustrating an example of a process by an information processing system according to the second embodiment. This process illustrates another example of the process in which the user 20 for which the account information has already been registered in the information processing apparatus 100, registers the terminal identification information of the mobile terminal 110 in the information processing apparatus 100. In the process illustrated in FIG. 11, the processes of steps S701 to S707 and S714 to S715 are the same as the processes by the information processing system according to the first embodiment described with reference to FIG. 7. Therefore, the differences from the first embodiment will be mainly described herein.

In the authentication process of step S707, when login from the mobile terminal 110 is allowed, in step S1101, the first authenticating unit 504 of the information processing apparatus 100 transmits a report indicating that login is allowed to the mobile terminal 110. The information processing apparatus 100 according to the second embodiment does not need to transmit the registration application screen to the mobile terminal 110 at this time.

In step S1102, the registration screen creating unit 1001 of the mobile terminal 110 creates the registration screen 830, for example, as illustrated in FIG. 8C, based on the predetermined registration information. The registration screen creating unit 1001 may create the registration screen 830 in accordance with the report, indicating that login is allowed, received from the information processing apparatus 100 or may wait for a creation operation by the user to be received before creating the registration screen 830.

The registration screen creating unit 1001 may acquire terminal identification information (identification information) of the mobile terminal 110 by using the acquiring unit 524 and create the registration screen 830 displaying the terminal identification information (for example, the UUID) of the mobile terminal 110 as illustrated in FIG. 8C. As another example, the acquiring unit 524 of the mobile terminal 110 may acquire the terminal identification information of the mobile terminal 110 when the first identification information transmitting unit 525 transmits a registration request to the information processing apparatus 100 in step S715.

In step S1103, the display control unit 527 of the mobile terminal 110 displays the registration screen 830 created by the registration screen creating unit 1001 on a display unit, such as the display 317.

By the above-described process, the mobile terminal 110 can create the registration screen 830 by a function (the registration screen creating unit 1001) implemented by an application executed by the mobile terminal 110.

As described above, according to the embodiment of the present invention, the account information already registered in the information processing apparatus 100 can be used to log in to the information processing apparatus 100 from the electronic device without having the account information input to the operation unit of the electronic device such as the image forming apparatus 120.
<Supplement>

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

Further, the devices described in each of the embodiments described above represent only one of a plurality of computing environments for carrying out the embodiments disclosed herein. In some embodiments, the information processing apparatus 100 includes a plurality of computing devices such as a server cluster. The plurality of computing devices are configured to communicate with each other via any type of communication link, including a network, a shared memory, or the like, and perform the processes disclosed herein.

The elements of the information processing apparatus 100 may be grouped into a single server apparatus or may be divided into a plurality of apparatus.

According to one embodiment of the present invention, the account information that is already registered in the information processing apparatus can be used to log in to the information processing apparatus from the electronic device without inputting the account information to an operating unit of the electronic device.

The information processing apparatus, the information processing system, the information processing method, and the recording medium are not limited to the specific embodiments described in the detailed description, and variations and modifications may be made without departing from the spirit and scope of the present invention.

What is claimed is:

1. An information processing apparatus configured to communicate with a mobile terminal used by a user, the information processing apparatus comprising:
   circuitry; and
   a memory storing computes executable instructions that cause the circuitry to execute:
      managing account information including login information of the user;
      receiving, from the mobile terminal, a first login request including the login information of the user;
      allowing login from the mobile terminal upon comparing the login information included in the first login request with the login information included in the account information;
      associating identification information unique to the mobile terminal with the account information, in response to receiving the identification information from the mobile terminal for which the login is allowed, the identification information unique to the mobile terminal is information associated with the mobile terminal from before receipt of the first login request;
      receiving, from an electronic device, a second login request including the identification information; and
      comparing the identification information included in the second login request with the identification information associated with the account information, wherein
         login from the electronic device is allowed in a case where the identification information included in the second login request matches the identification information associated with the account information, and
         allowance of the login from the electronic device permits the user to use functions of the electronic device.

2. The information processing apparatus according to claim 1, wherein the circuitry is further caused to execute:
   transmitting registration information to a transmission destination corresponding to the account information, in response to a request from the mobile terminal for which the login is allowed.

3. The information processing apparatus according to claim 2, wherein
   the login information includes a mail address, and
   the transmitting includes transmitting the registration information to the mail address.

4. The information processing apparatus according to claim 1, wherein the associating includes associating a plurality of pieces of the identification information with the account information.

5. The information processing apparatus according to claim 1, wherein the circuitry is further caused to execute:
   cancelling the associating of the identification information with the account information, in response to determining that a predetermined number of pieces of the identification information are already associated with the account information when the identification information is received from the mobile terminal.

6. An information processing system comprising:
   the information processing apparatus according to claim 1; and
   a program configured to be installed in the mobile terminal, wherein
      the program causes a computer to execute a process performed in the mobile terminal, the process including:
         acquiring the identification information unique to the mobile terminal;
         transmitting the identification information to the information processing apparatus according to a registration operation by the user; and
         transmitting the identification information to the electronic device.

7. The information processing system according to claim 6, wherein
   the process performed in the mobile terminal further includes displaying, on a display, a registration screen used for registering the identification information in the information processing apparatus,
   the transmitting to the information processing apparatus includes transmitting the identification information according to the registration operation with respect to the registration screen, and
   the transmitting to the electronic device includes transmitting the identification information by predetermined short range wireless communication.

8. The information processing system according to claim 6, wherein
   the information processing system includes the electronic device, and
   the electronic device allows usage of the electronic device by the user in response to detecting that the information processing apparatus has allowed the login from the electronic device.

9. An information processing method performed by an information processing apparatus configured to communicate with a mobile terminal used by a user, the information processing method comprising:
   managing account information including login information of the user,
   receiving, from the Mobile terminal, a first login request including the login information of the user;
   allowing login from the mobile terminal upon comparing the login information included in the first login request with the login information included in the account information;
   associating identification information unique to the mobile terminal with the account information, in response to receiving the identification information from the mobile terminal for which the login is allowed, the identification information unique to the mobile terminal is information associated with the mobile terminal from before receipt of the first login request;
   receiving, from an electronic device, a second login request including the identification information; and
   comparing the identification information included in the second login request with the identification information associated with the account information, wherein
      login from the electronic device is allowed in a case where the identification information included in the second login request matches the identification information associated with the account information, and allowance of the login from the electronic device permits the user to use functions of the electronic device.

10. A non-transitory computer-readable recording medium storing a program that causes a computer to execute a process performed in an information processing apparatus configured to communicate with a mobile terminal used by a user, the process comprising:

managing account information including login information of the user;

receiving, from the mobile terminal, a first login request including the login information of the user;

allowing login from the mobile terminal upon comparing the login information included in the first login request with the login information included in the account information;

associating identification information unique to the mobile terminal with the account information, in response to receiving the identification information from the mobile terminal for Which the login is allowed, the identification information unique to the mobile terminal is information associated with the mobile terminal from before receipt of the first login request;

receiving, from an electronic device, a second login request including the identification information; and comparing the identification information included in the second login request with the identification information associated with the account information, wherein login from the electronic device is allowed in a case where the identification information included in the second login request matches the identification information associated with the account information, and allowance of the login from the electronic device permits the user to use functions of the electronic device.

* * * * *